United States Patent [19]
Stein

[11] 3,771,741
[45] Nov. 13, 1973

[54] FISH LINE RESTRAINER
[76] Inventor: Leon J. Stein, 3301 N. 7th Ave., Phoenix, Ariz. 85013
[22] Filed: May 30, 1972
[21] Appl. No.: 258,112

[52] U.S. Cl...... 242/84.2 G, 242/84.1 K, 242/125.2
[51] Int. Cl............................................. A01k 89/00
[58] Field of Search.................. 242/84.1 J, 84.2 G, 242/84.2 A, 84.21 R, 84.2 R, 125.2, 125.3, 125, 149; 43/25.2, 25

[56] References Cited
UNITED STATES PATENTS
2,728,534  12/1955  Wallace.......................... 242/84.21 R
1,920,478  8/1933   Norton................................. 43/25.2

FOREIGN PATENTS OR APPLICATIONS
920,854  4/1947  France............................ 242/84.1 K
1,176,849  4/1959  France..................................... 43/25

Primary Examiner—Billy S. Taylor
Attorney—John Cyril Malloy

[57] ABSTRACT

For use on a spinning reel, a line restrainer to hold the end of the line when the reel is not in use. The line restrainer includes means adapting it for attachment to the bail at about its location to the housing, and means for capturing the end of the fishing line, the body being sized to fit in the space between the bail and the handle for operating the spinning reel in an out of the way disposition.

4 Claims, 3 Drawing Figures

PATENTED NOV 13 1973　　　　　　　　　　　　3,771,741

FISH LINE RESTRAINER

This invention relates to spinning reels for use in fishing and, more particularly, to an improved spinning reel with anti-fouling means for the line so that it does not unwind and a length of it becomes tangled and snarled when not in use, as when stored or being transported to a fishing site.

As is perhaps well known, spinning reels used in fishing include a spool on which a supply of a line is wound and which is free spinning and that such reels include means to apply a drag to the line when a fish is hooked so that it can be reeled in against a tension applied to the line by reason of the drag. Most often, when such spinning reels are not in use and stored, the fishing line becomes unwound from the spool; and, when this happens, there is created a snarl and a knotted tangled line which must be unraveled or cut before the device can be used.

The present invention is of a line restrainer which is mounted by suitable means to the bail of a spinning real and which is adapted to keep the line in order when it is not in use, stored, or being transported. The line restrainer includes a body having a groove sized to receive the end zone portion of the bail adjacent the pivot mount, when it is connected to the housing for the spool; the body of the line restrainer is sized to fit in the space between the bail and the handle, which is used for rotating the spool so that it does not interfere with rotation of the handle in use. The body of the restrainer includes mounting means for attachment to the bail which in the preferred embodiment is in the form of a groove in the restrainer body which is adapted to receive the bale and a screw adapted to be threadedly received in the bore and advanced into gripping relation against the bale to hold it firmly in captivated position in the groove. The body also includes an aperture or recess into which the line end is adapted to be inserted and a keeper which is moved into and out of holding relation of the line, so that it does not become unraveled. In use, one simply secures the line to the line restrainer by a) passing the end into a catch provided on the line restrainer and b) applying a slight drag to the reel so that it will not turn while it is in storage. Thereafter, in storage the line will not become entangled or unraveled and create a snarl.

In the past, numerous devices have been made and taught for use to restrain a line on a spool so that it does not become entangled when they are stored or transported. Such a prior art effort is found in U.S. Pat. No. 3,164,334, in which a device is provided for attachment to the base or a footed portion of the spinning reel and in which the end of the line is adapted to be wound about and secured thereby. The instant invention comprises an improvement over the devices in the prior art and that of the aforesaid patent in that it comprises a simple piece to be attached to the bail in an out of the way position without the need for complicated operating parts.

Accordingly, it is an object of this invention to provide an improved line restrainer or means for maintaining a line in an orderly condition on a spinning reel spool when not in use. More specifically, it is the general object of this invention to provide an inexpensive restrainer for a line, which restrainer is adapted to be mounted to a conventional bail employed on spinning reels, the restrainer being sized to fit in an out of the way location on the bail and between the periphery of the space generated by the rotation of the handle and the spool housing. It includes means, in addition to those for attachment of the device to the bail, for grasping and holding a line when not in use and adapted to release the line for use in fishing.

In accordance with these and other objects which will become apparent hereinafter, the instant invention will now be described with reference to the accompanying drawings in which.

Figure 1:
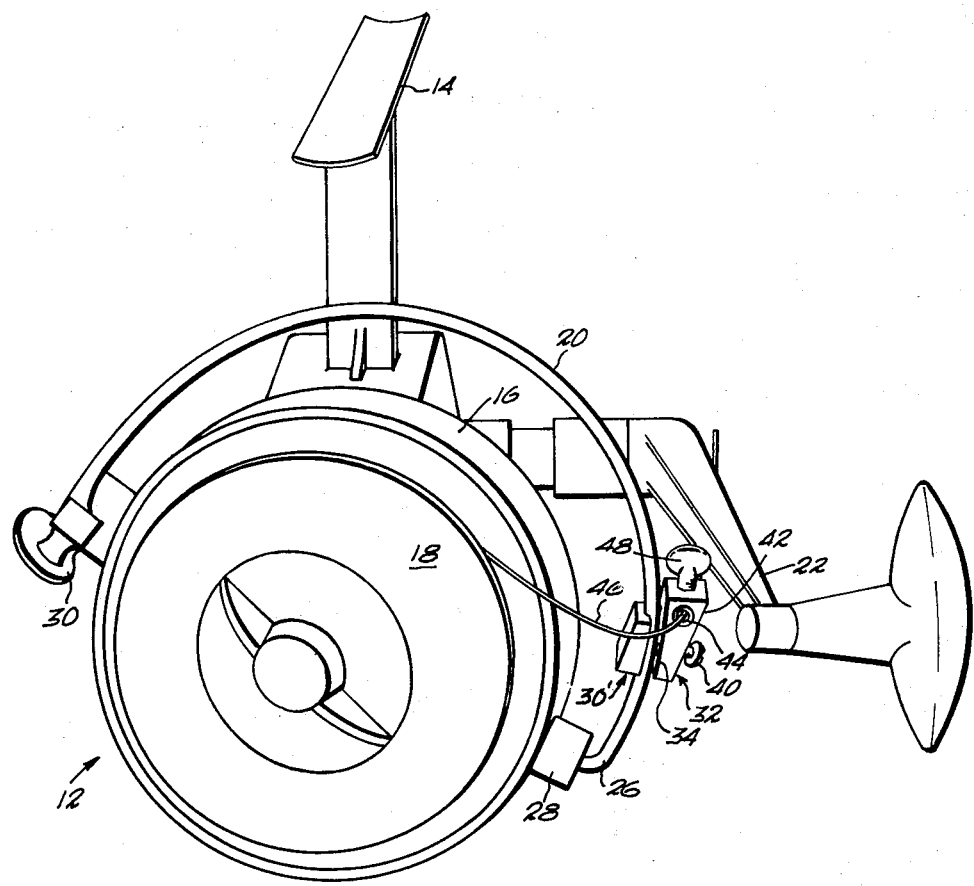
FIG. 1 is a perspective view of a spinning reel provided with the instant invention.
Figure 2:
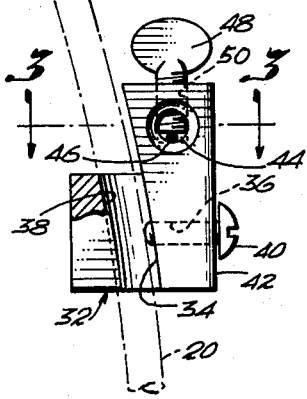
FIG. 2 is a front elevation view which has been partly broken away and which illustrates the restrainer.
Figure 3:
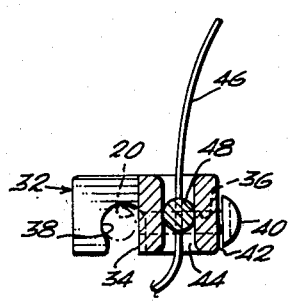
FIG. 3 is a view in cross section taken on the plane indicated by the line 3—3 of FIG. 2 and looking in the direction of the arrows.

Referring to the drawings wherein like reference characters designate like or corresponding parts throughout the several views, the numeral 12 generally designates a spinning reel including a portion 14 for attachment to a rod and a housing 16 for the spool 18 which is rotatable about a fore-to-aft axis. The spinning reel includes conventional means for rotating the spinning reel and for reciprocating into and out of the housing for distribution of the line over the spool. Also, as is conventional, the spinning reel includes a conventional drag inducing means, not shown, a bail 20, and a handle 22 for operating the reel. With further reference to the drawings, it is seen that the bail includes a first end 26 which is pivotally connected to a boss 28 on the housing and a mechanism 30 on the opposite bail end whereby the bail is pivotally connected to the housing for movement across the path of discharge of the line. As is conventional, the bale includes a catch means to catch the line when it is slipped into position, as is well known. In use the handle operator 22 is rotated about an axis which is perpendicular generally to the axis of the spool and, when the handle is rotated, a space is defined between it and the bail which is relatively close to the housing. It is in this space that the restrainer 30' is secured to the bail, see FIG. 1. The restrainer includes a body 32 and mounting means for attachment of it to the bail, which in the preferred embodiment is in the form of a groove 34 through the front surface of the body, the groove being sized to receive the bail as shown and to act in combination with a keeper means to releasably secure it to the bail. More particularly, the keeper means for the bail comprises a threaded bore 36 which is aligned on a line spaced from the floor 38 of the groove a distance about equal to the diameter of the conventional base and a threaded screw 40 for threaded advancement into and out of the groove to contact and to hold the bail to hold the restrainer in position, as shown in FIG. 1 and FIG. 2, it being noted that the screw 40 is accessible from the outside surface 42 of the body of the restrainer. Also, the restrainer body includes an aperture 44 into which the end of the line 46 is adapted to be inserted and so as to be adapted for contact with the end of a threaded screw 48 which is advanceable in a threaded bore 50 so that the end of the screw 50 grips the line and holds it when advanced. In use, one merely inserts the end of the line into the aperture, and, after drag is applied, the line will not become untangled.

What is claimed is:

1. A line restrainer for attachment to the bail of a spinning reel having a housing, a spool journaled in the housing, and a fore to aft axis, a bail pivotally mounted to the housing and swingable across the axis of the spool, and a handle with a lateral axis of rotation and means for rotation of the spool, the handle being in spaced relation outside of the bail and housing, said restrainer including, a body with a top and bottom surface, opposing inside and outside surfaces, and a front and rear surface;

a groove in the body across the front surface, said groove being sized to receive and nest a length of the bail adjacent its connection to the housing, first keeper means on the body and accessible from the outside surface to captivate the bail in the groove;

means in the body to receive the end of the line; and second keeper means to captivate the end of the line in the means to receive, the dimension of said body between said outside surface and the groove being less than the distance between the bail of a conventional spinning reel and the distance to the inside surface of the handle from the bail, whereby the restrainer is adapted to ride upon the reel without interference with manipulation of the operator of the spinning reel.

2. The line restrainer as set forth in claim 1 wherein said first keeper means comprises a first threaded bore extending from said outside surface through the body to the groove, said groove lying between said inside and outside surfaces, and a threaded screw in the first threaded bore advanceable into and out of the groove to bear against and captivate the bail when in the groove.

3. The restrainer as set forth in claim 2 wherein said second keeper means comprises a second threaded bore extending from the top surface and to the recess and a threaded screw advanceable through the second bore into and out of the recess to bear against the end of a line to captivate the same when inserted therein.

4. The restrainer as set forth in claim 1 wherein said second keeper means comprises a second threaded bore extending from the top surface and to the recess and a threaded screw advanceable through the second bore into and out of the recess to bear against the end of a line to captivate the same when inserted therein.

* * * * *